United States Patent
Freed et al.

(10) Patent No.: US 12,273,304 B2
(45) Date of Patent: Apr. 8, 2025

(54) ALTERING AUTOMATED CONVERSATION SYSTEMS

(71) Applicant: International Business Machines Corporation, Armonk, NY (US)

(72) Inventors: Andrew R. Freed, Cary, NC (US); Lalit Agarwalla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 17/244,846

(22) Filed: Apr. 29, 2021

(65) Prior Publication Data

US 2022/0353210 A1 Nov. 3, 2022

(51) Int. Cl.
*G06N 5/01* (2023.01)
*H04L 51/02* (2022.01)

(52) U.S. Cl.
CPC .............. *H04L 51/02* (2013.01); *G06N 5/01* (2023.01)

(58) Field of Classification Search
CPC ......... H04L 51/02; H04L 51/216; G06N 5/01; G06N 20/00; G10L 15/02; G10L 15/26
See application file for complete search history.

(56) References Cited

U.S. PATENT DOCUMENTS

| | | | | |
|---|---|---|---|---|
| 5,799,311 A * | 8/1998 | Agrawal | .................. | G06F 16/35 |
| | | | | 707/999.102 |
| 6,138,115 A * | 10/2000 | Agrawal | ................ | G06N 20/00 |
| | | | | 709/215 |
| 6,154,736 A * | 11/2000 | Chickering | .............. | G06N 7/01 |
| | | | | 706/45 |
| 8,290,882 B2 * | 10/2012 | Sharp | ........................ | G06N 5/02 |
| | | | | 706/26 |
| 10,162,697 B2 * | 12/2018 | Fradkin | ................. | G06F 11/008 |
| 10,762,438 B1 * | 9/2020 | Zhang | .................... | G06N 20/00 |
| 10,853,394 B2 * | 12/2020 | Kondadadi | .............. | G06N 3/04 |
| 10,891,950 B2 | 1/2021 | Huang | | |
| 10,896,670 B2 | 1/2021 | Eisenzopf | | |
| 11,281,991 B2 * | 3/2022 | Raskovalov | ........... | G06N 20/00 |
| 2006/0010093 A1 * | 1/2006 | Fan | ........................ | G06F 16/40 |
| 2011/0161272 A1 * | 6/2011 | Love | ........................ | G06F 8/34 |
| | | | | 706/47 |
| 2014/0257816 A1 * | 9/2014 | Morinaka | ............... | G10L 13/02 |
| | | | | 704/260 |

(Continued)

FOREIGN PATENT DOCUMENTS

KR    101940719 B1    7/2014

OTHER PUBLICATIONS

Bot Builder, Smarter, Streamlined Bot Paths With Conditional Logic Nodes, Published Oct. 15, 2020, https://www.instabot.io/blog/streamline-bots-with-conditional-logic (Year: 2020).*

(Continued)

*Primary Examiner* — Dhairya A Patel
*Assistant Examiner* — Vinh Nguyen
(74) *Attorney, Agent, or Firm* — David K. Mattheis

(57) ABSTRACT

Altering an automated conversation system by receiving automatic conversation log data, generating a decision tree from the data, summarizing child node data for a node of the decision tree, generating node response variations according to the child node data of the node, and altering the automatic conversation according to the node response variations.

17 Claims, 5 Drawing Sheets

(56) References Cited

U.S. PATENT DOCUMENTS

| | | | |
|---|---|---|---|
| 2014/0272884 A1* | 9/2014 | Allen | G06N 5/04 |
| | | | 434/322 |
| 2016/0180372 A1* | 6/2016 | Lu | G06Q 30/0242 |
| | | | 705/14.41 |
| 2018/0005126 A1* | 1/2018 | Yamagami | G06Q 30/02 |
| 2018/0068012 A1* | 3/2018 | O'Connor | G06F 16/5854 |
| 2018/0349382 A1* | 12/2018 | Kumaran | G06F 17/12 |
| 2019/0019108 A1* | 1/2019 | Eads | G06N 7/01 |
| 2019/0020609 A1* | 1/2019 | Asukai | G06F 40/35 |
| 2019/0104092 A1* | 4/2019 | Koohmarey | H04L 51/02 |
| 2019/0130904 A1* | 5/2019 | Homma | G06N 3/088 |
| 2019/0138879 A1* | 5/2019 | Hu | G06N 5/01 |
| 2019/0347326 A1* | 11/2019 | Kozhaya | G06F 40/30 |
| 2019/0377790 A1* | 12/2019 | Redmond | G06F 40/205 |
| 2020/0004874 A1 | 1/2020 | Gupta | |
| 2020/0004878 A1* | 1/2020 | Beaumont | G06F 16/685 |
| 2020/0012673 A1* | 1/2020 | Rudzicz | G06F 16/334 |
| 2020/0012720 A1* | 1/2020 | Elson | G06F 3/167 |
| 2020/0019569 A1 | 1/2020 | Hoshino | |
| 2020/0043026 A1* | 2/2020 | Cruz-Rivera | G06N 5/04 |
| 2020/0059559 A1* | 2/2020 | Mazza | H04M 3/5183 |
| 2020/0105255 A1* | 4/2020 | Huang | G06F 16/9024 |
| 2020/0125901 A1* | 4/2020 | Pelov | H04L 51/02 |
| 2020/0143265 A1* | 5/2020 | Jonnalagadda | G06N 3/045 |
| 2020/0193094 A1 | 6/2020 | Topol | |
| 2020/0236068 A1 | 7/2020 | Tenyenhuis | |
| 2020/0250382 A1* | 8/2020 | Mars | G06F 16/3329 |
| 2020/0272941 A1* | 8/2020 | Jensen | G06N 5/01 |
| 2020/0285553 A1* | 9/2020 | Ohana | H04L 51/02 |
| 2020/0302019 A1* | 9/2020 | Hall | G10L 15/22 |
| 2020/0302919 A1* | 9/2020 | Greborio | G10L 15/1822 |
| 2020/0320134 A1* | 10/2020 | Beaver | G06F 18/2178 |
| 2020/0327196 A1* | 10/2020 | Sampat | G06N 20/00 |
| 2020/0335097 A1* | 10/2020 | Seol | G06N 5/043 |
| 2020/0342331 A1* | 10/2020 | Takenouchi | G06F 16/2246 |
| 2020/0342850 A1* | 10/2020 | Vishnoi | G06F 40/30 |
| 2020/0349199 A1* | 11/2020 | Jayaraman | G06F 40/49 |
| 2020/0382449 A1* | 12/2020 | Taylor | G06F 16/3329 |
| 2022/0051104 A1* | 2/2022 | Interlandi | G06N 3/045 |
| 2022/0230203 A1* | 7/2022 | Liu | G06F 18/24323 |
| 2023/0037894 A1* | 2/2023 | Arya | G06F 40/40 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

"How your dialog is processed", IBM Cloud Docs, Watson Assistant (Managed), Last updated: Mar. 4, 2021, 4 pps., <https://cloud.ibm.com/docs/assistant?topic=assistant-dialog-build>.

"Profiling", From Wikipedia, the free encyclopedia, This page was last edited on May 5, 2020, 1 pp., <https://en.wikipedia.org/wiki/Profiling_(computer_programming)>.

Baeldung, "A Guide to Java Profilers", Last modified: Oct. 26, 2018, DevOps, 8 pps., <https://www.baeldung.com/java-profilers>.

* cited by examiner

ALTERING AUTOMATED CONVERSATION SYSTEMS

FIELD OF THE INVENTION

The disclosure relates generally to the analysis and alteration of automated conversation systems. The disclosure relates particularly to the analysis of automated conversation systems and the generation of response variations.

BACKGROUND

Automated conversation systems including chatbots, etc., provide a channel for interacting with users to provide information and satisfy requests without the need to engage a human agent. Such systems function using a dialog flow designer constructed to receive user input and provide an output according to an analysis of the user input. Such automated systems may lack efficiency and result in frustrated users and no reduction in the need for human agents.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the alteration of automated conversation systems.

Aspects of the invention disclose methods, systems and computer readable media associated with altering an automated conversation by receiving automatic conversation log data, generating a decision tree from the data, summarizing child node data for a node of the decision tree, generating node response variations according to the child node data of the node, and altering the automatic conversation according to the node response variations.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
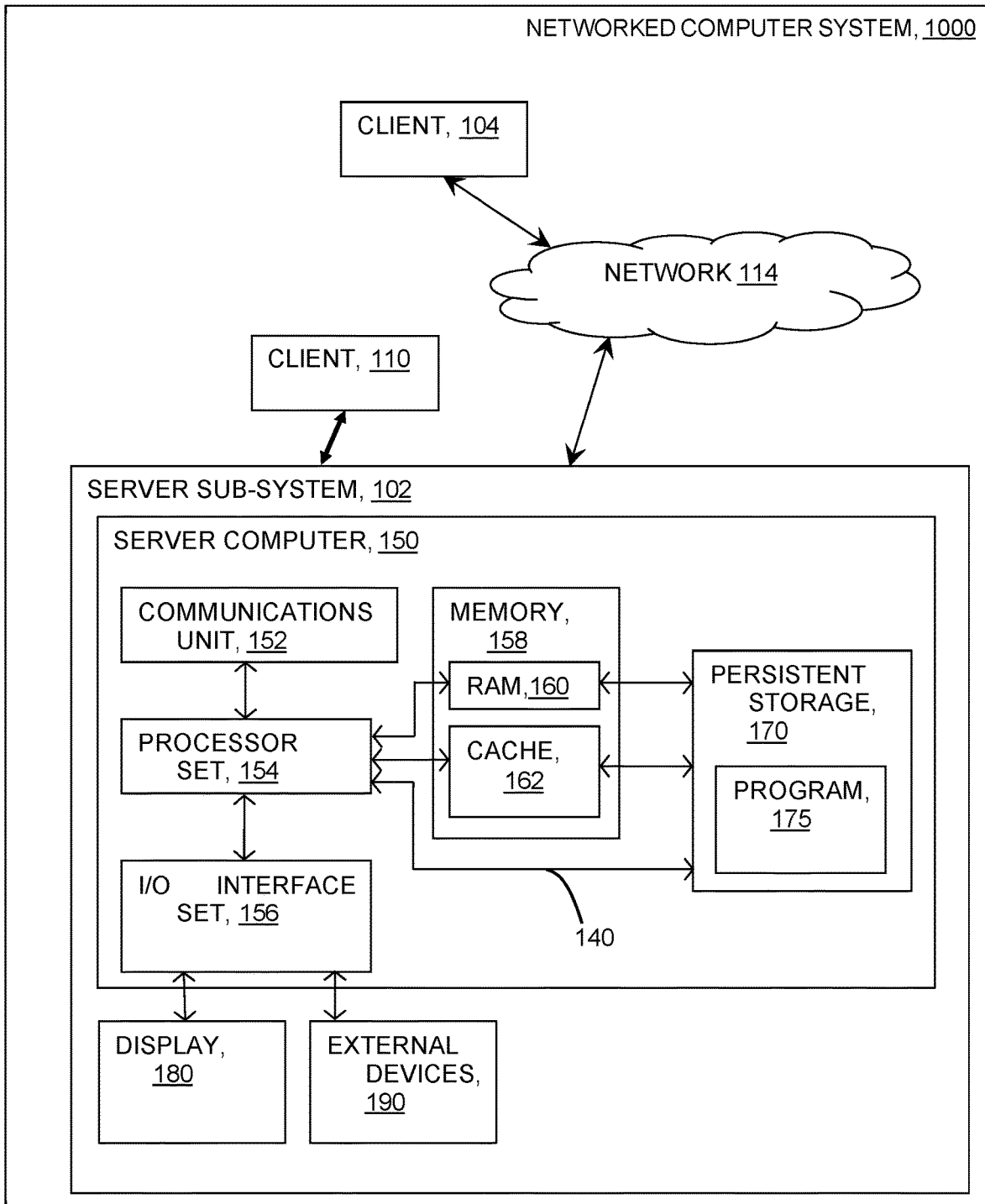
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

For automated conversational systems such as chatbots, voicebots, or other virtual agents, analyzing user conversation logs is a resource and time-consuming task. Improving such systems benefits from ongoing or continuous analysis of the conversation logs. Disclosed embodiments enable profiling of automated conversation dialog flows to improve automated conversation efficiency.

Aspects of the present invention relate generally to altering automated conversation systems to improve the efficiency of the systems. Such automated systems utilize a dialog flow tree of nodes for the control of the dialog and the determination of how the interactive bot should respond to user inputs or utterances. Improving such dialog flow designers requires data indicating with a level of confidence the issues of the current design and suggested alterations to alleviate the identified issues. Disclosed embodiments annotate various aspects of the dialog flow designer decision tree. The annotations provide conversation attributes including how many times each node has been traversed over the course of the provided conversation data, a summary of user utterances at each decision tree node—conversation turn—details of users digressing away from specific conversation turns, user utterances that the system cannot understand at each conversation turn, conversation turn details wherein a user requests assistance from a live agent, suggestions form users for system improvements, etc. As used herein, a conversation turn refers to pairings of utterances between the bot and the user wherein one message is a response to the other. As an example, the bot provides an output and the user, in turn, responds to the output, forming a conversation turn. As an example, the conversation log data may include data for a dialog node labeled "Capture User First Name", the node asks the user: "What is your first name?" and receives a user response of "David". This pair of question and answer constitutes a conversation turn. The data includes links between the question and received answer.

In accordance with aspects of the invention there is a method for automatically generating response variations for an automated conversation system. The method includes receiving conversation log data from a system and generating a dialog flow designer decision tree from the conversation data. Further analysis of the data identifies the series of conversation turns forming each bot-user conversation. The method maps or otherwise associated each identified conversation turn from the data to a decision node of the designer decision tree. The method annotates the conversation turns for each node of the tree and summarizes the child node data for each node of the tree. Using the conversation turn annotations, the method generates conversation turn variations for the system and further generates decision node response variations.

Aspects of the invention provide an improvement in the technical field of automated chat systems. Conventional automated chat systems utilize static (i.e., unchanging) dialog flow designers when deciding what answer to provide in response to a question posed by a user. Such systems do not analyze chat conversation logs and become more efficient in answering user queries over time. As a result, the system remains fixed at the low efficiency associated with the static dialog flow designer which may or may not produce satisfactory results. Conversation log data may provide insights into alternative chatbot response to patterns of user queries. Implementations of the invention leverage tis data to generate alternative chatbot responses and alternative conversation turns for the chatbot. This provides the improvement of raising the efficiency of the chatbot automated conversations in terms of satisfying the user's queries without a need for human agent intervention.

Aspects of the invention also provide an improvement to computer functionality. In particular, implementations of the invention relate to a specific improvement to the way automated conversation systems operate, embodied in the continually adjusted dialog flow designer decision tree responses. In embodiments, the system adjusts the dialog flow conversation turns and decision tree node responses according to the analysis of the conversation log data in determining he response to the current question. As a result of adjusting the dialog flow decision tree conversation turns and node responses, the methods increase the likelihood that the user will have a successful interaction with the automated conversation system. In this manner, embodiments of the invention affect how the automated conversation system functions (i.e., the likelihood of providing a useful of desired answer to a question) from one question to the next.

In an embodiment, one or more components of the system can employ hardware and/or software to solve problems that are highly technical in nature (e.g., receiving automatic conversation log data, generating a decision tree from the data, identifying conversation turns for a node of the tree, annotating the conversation turns of the node, summarizing child node data for the node, generating conversation turn variations according to the annotations of the conversation turns of the node, generating node response variations according to the child node data of the node, altering the automatic conversation according to the generated node response variations, etc.). These solutions are not abstract and cannot be performed as a set of mental acts by a human due to the processing capabilities needed to facilitate altering automatic conversations. There may be hundreds or even thousands of reasoning algorithms applied, each of which performs different analysis, e.g., comparisons, natural language analysis, lexical analysis, or the like, and generates a score. It is well understood in the art that such deep analysis, including the amount of data being analyzed and number of reasoning algorithms applied in the analysis, cannot practically be performed in the human mind or with pencil and paper. Further, some of the processes performed may be performed by a specialized computer for carrying out defined tasks related to generating options for altering automatic conversations. For example, a specialized computer can be employed to carry out tasks related to altering automatic conversations or the like.

In an embodiment, a method receives full automated conversation log data. The log data may be text data from chatbot conversations with users, or speech to text transcriptions of user conversations with voicebots. The data may include user and bot conversation turns as well as dialog flow designer details such as nodes visited as part of constructing the bot turs of the conversation. In this embodiment, the method identifies conversation turns for each of the bot and the user, and groups the turns into bot-user response conversation turn pairings, according to the context of the user response to the bot output, as well as the time delay between the bot output and the user response. In an embodiment, the method considers responses delayed beyond a threshold part of new turn pairing beginning with the user input. In this embodiment, the method gathers the conversation log data conversation turn pairings into a tree structure format using the nodes visited details as well as the rest of the conversation log data. In this embodiment, the method utilizes a data format from JSON or XML, language to collect the data into the decision tree of nodes. In an embodiment, the decision tree includes parent decision nodes associated with questions posed to a user by the bot. Each parent node has a number of child nodes for evaluating the possible responses to the question posed by the parent. The conversation log data includes details of the parent and child node relationships and conversation activities over the course of the log data.

The method traverses the node structure of the constructed decision tree. For each node of the constructed decision tree the method collects the unique identifier assigned, for example, by the chatbot platform, for the node. The chatbot platform may assign a global unique identifier (GUD) to each node. The method collects the GUD for each node. The method searches the conversation log data for the node identifier to find the conversation turns which include the node. In this embodiment, the method tracks and also overlays the determined number of visits for each node upon a graphical presentation of the decision tree structure, showing how many visits to each node occur in the log data as well as the responses associated with those visits and the number of each type of possible response for the node.

In an embodiment, the method defines one or more feature vectors for the nodes and populates each feature vector using the annotations identified for the conversation log data associated with the respective nodes. In this embodiment, the method utilizes the feature vectors in analyzing the dialog flows and the nodes of the decision tree.

The method continues the log data analysis for each node, annotating conditional node segments of the tree with collected data from the logs indicating the number of times each possible condition was true. For example, fifty occurrences for if(intent=get status) and twenty-fice occurrences of if(context.type=gold member).

The method captures and provides links to all log records filtered at each node id for use in generating alternative conversation flow paths along the decision tree nodes. For nodes having a "wait for user reply" functionality, wherein the conversation system waits for user input and then analyzes and responds to that user input, the method tracks and categorizes the details of user utterances or typed responses to the previous bot conversation turn. The method categorizes responses according to associated child node actions or according to user digression, wherein no child node progression occurs as the user has deviated from the dialog flow tree with their response to the bot turn. The method also categorizes those responses which the automated system cannot understand for speech to text or cannot construe from the typed responses of the log data.

In an embodiment, the method summarizes additional conversation log data based upon the child node conditions for each node of the decision tree. For each node the method determines the intents and the distribution of those intents presented at the parent node. For each intent the method tracks the frequency of most common words presented to the node in the log data. For each node the method tracks the entities and the distribution of those entities at the parent node and the frequency of the most common words associated with each of the entities at the parent node. For context variables, the method tracks the number of tests and the testing frequency for each variable at the node and the distribution of the variable values from the collective set of tests. The method further tracks the keywords, and n-grams appearing in the user responses for the child nodes of the parent node decisions and categorizes the keywords and n-grams according to the child nodes, intents, and entities, associated with the keywords and n-grams in the log data. In this embodiment, the method adds the summarized aspects of the log data for each node to the annotations for the respective nodes.

After traversing each node of the decision tree and annotating the conversation turns associated with the nodes, the method analyzes the annotated node conversation turn data to generate suggestions for altering or adjusting the dialog flows of the conversation system. Suggestions include dialog flows alterations to alter dialog flows associated with abnormally high, >99%, or abnormally low, <1% decision results. Suggested dialog flows may eliminate such decision points from the flows.

In an embodiment, the method uses mutation testing, or similar concepts, to alter the current dialog flows associated with abnormally high or abnormally low results. In this embodiment, the method applies such testing to conditional decisions, generating alternative flows and determining any changes associated with the conditional results percentages for each of the generated alternatives. The method retains changes resulting in more than a defined threshold change in decision percentages. The method discards changes having little or no impact on decision outcome percentages, as indicated by comparison to the defined threshold. In an embodiment, the method generates changes utilizing thresholds which differ according to the classification of the type of decision made at a node.

As an example, conversation log data indicates a conditional decision of context.type=gold AND context. balance<1000 has no actual results for the combination being true. Data also indicates that context. type=gold is true one hundred times, and context. balance<1000, is true two hundred times. As the combination being true has abnormally low results, -zero-the method suggests alternatives including variation one, replacing the AND with OR. Testing this mutation indicates the combination is true three hundred times. The method also suggests variation two, changing the equal to operator "=", to a not equal to operator "!=", wherein the combination becomes true two hundred times. Suggested variation three removes the context. balance test, resulting in the conditional being true one hundred times.

In an embodiment, the method generates the response variations and provides them for user selected input. In an embodiment, the method selects the variation yielding the largest absolute change in the number of true decisions from the original state. In an embodiment, the method implements each of the variations either sequentially, or using a randomizer to select which of the three alternatives to use each time the node is traversed. In this embodiment, the method continues to evaluate the new conversation log data to determine the need for additional changes to this portion of the dialog flow.

In an embodiment, the method analyzes the child node data and generates new response conditions for the parent nodes according to that analysis. In this embodiment, the method considers keywords and n-grams from the conversation log data which lack a strong affinity to an identified intent or entity. In this embodiment, for parent nodes which check entities, the method adds the identified keywords or n-grams as synonyms for an identified entity. In this embodiment, the method uses a clustering algorithm or feature vector embeddings of the text of the conversation log data to determine levels of similarity between the keywords or n-grams lacking a strong affinity and a "best choice" to identify as the entity to add the keywords or n-grams as synonyms.

In an embodiment, for those parent nodes having intent based conditions, the method proposes a new intent, trained using the top n-most frequent responses using the keywords or n-grams associated with the node but lacking a strong affinity to any existing intents for the node's responses.

For example, a bot query of: "Are you a provider or a member?", where child nodes check the user response against @caller.type. Responses such as "I am a Doctor" or "I am a patient", initially lack affinity for the expected response of "provider" or "member". After application of the method and analysis using clustering or word embeddings for the log data, the method attaches "Doctor" as a synonym to @caller.type:provider, and "patient" as a synonym to @caller.type:member.

In an embodiment, the method evaluates decision tree performance for a regression testing suite following the steps set forth above. The method analyzes the decision tree data, traverses the nodes of the tree, annotating the data according to the decision tree performance, and generates suggestions to alter the decision tree to remove underperforming or overperforming nodes—those nodes contributing little to the decision process of the tree.

In an embodiment, the method analyses test data associated with a decision tree and actual production data for the decision tree. The method compares the test data analyses and the production data analyses, identifying on a node-by-node basis, nodes in the decision tree showing differences in annotated data and indicating necessary changes to the testing of the decision tree to conform the test data more closely to the real-time production data. As an example, the comparison indicates nodes having a production data visitation frequency greater than the test data visitation frequency, indicating a need to alter the testing to raise the visitation frequency during testing.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise automatic conversation modification program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the automatic conversation modification program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., automatic conversation modification program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
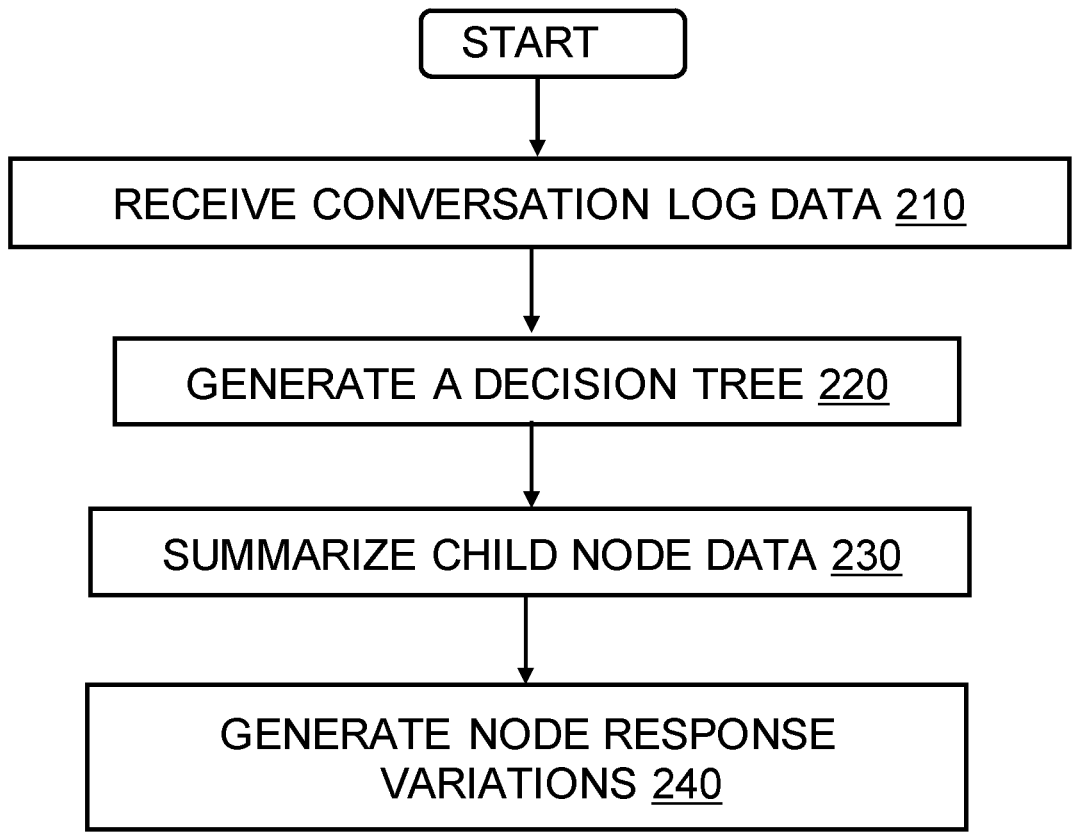
FIG. 2 provides a flowchart depicting an operational sequence, according to an embodiment of the invention.

FIG. 2 provides a flowchart 200, illustrating exemplary activities associated with the practice of the disclosure. After program start, at block 210, the method executing upon a computing system such as that of FIGS. 1 and/or 4, receives conversation log data from a chatbot, voicebots, or other automated conversation system. In an embodiment, the method receives decision log data associated with a decision tree.

At block 220, the method analyzes the log data including nodes visited details of the log data and constructs a decision tree comprising decision nodes representing the dialog flows extracted from the data.

The method executed by the computing system of FIGS. 1 and/or 3, or an analogous computing system, crawls, or otherwise traverses the decision tree, node by node, and identifies the conversation turns of the log data which are associated with each node—those turns where a particular node was visited. The method further identifies a unique node identifier for each node.

The method annotates the conversation turns for the node and builds an aggregate set of annotations for each node. Conversation node annotations include the number of total visits to the node, the cumulative number of each of the conditional decision made by the node, links to log records filtered by the node, user utterances or textual response to queries from the node, user utterances leading to digressions form the dialog flow of the node, utterances the system could not understand, etc.

At block 230, the method summarizes the child node log data for each identified node. Child log data including the distribution of intents and/or entities associated with the respective child nodes, the keywords and n-grams received from users together with the intents and entities to which the keywords and n-grams refer, context variables for the node as well as how often each variable is present in a turn, and the values the variables have when present.

The method generates conversation turn variations according to the conversation turn annotations for the node. Variations include options to prune tree nodes which have abnormally high or abnormally low decision results percentages. For example, nodes which are always true and nodes which are never true. Variations to conditionals include changes to the Boolean logic and/or operators of the conditional expressions of the node. In an embodiment, the method defines a mutation to the decision node and evaluates the log data to determine the extent of change in the node's dialog flows due to the change. The method retains changes producing levels of dialog flow change above a defined threshold and discards those changes which do not exceed the threshold. Thresholds may be defied in absolute terms for a number of additional dialog flows desired through the respective child nodes due to the change or in a relative manner such as a percentage change in the distribution of responses possible for the node across the set of child nodes.

At block 240, the method generates node response condition variations according to the child node data for the node. In an embodiment, the method evaluates keywords and n-grams from user utterances for the node which have little affinity for existing intents or entities associated with the node. For child node conditionals based upon intents, the method suggests training a new intent based upon the top n-most frequent user responses containing the keywords and n-grams lacking a strong affinity to any current intents. For child nodes conditionals based upon entities, the method evaluates the keywords and n-grams using clustering analysis or a word embedding for the conversation log data to identify analogs for the keyword or n-grams, wherein this analysis identifies the best choice for selection as an analog entity to which the method attaches the evaluated keyword or n-gram as a synonym.

In an embodiment, the method presents the node response variations and the conversation turn variations to a user and receives user selections before implementing the changes to the decision tree for the conversation system. In an embodiment, the method generates and implements the suggested changes to conversation turns and node responses without user input. In an embodiment, the method continues to receive and analyze the conversation log data during and after implementation of the suggested changes and tracks the evolution of the conversation system in terms of the node annotation changes associated with changes to the conversation turns and the node responses. The method tracks the timeline of change implementation together with changes in annotations for the affected nodes of the system.

Figure 3:
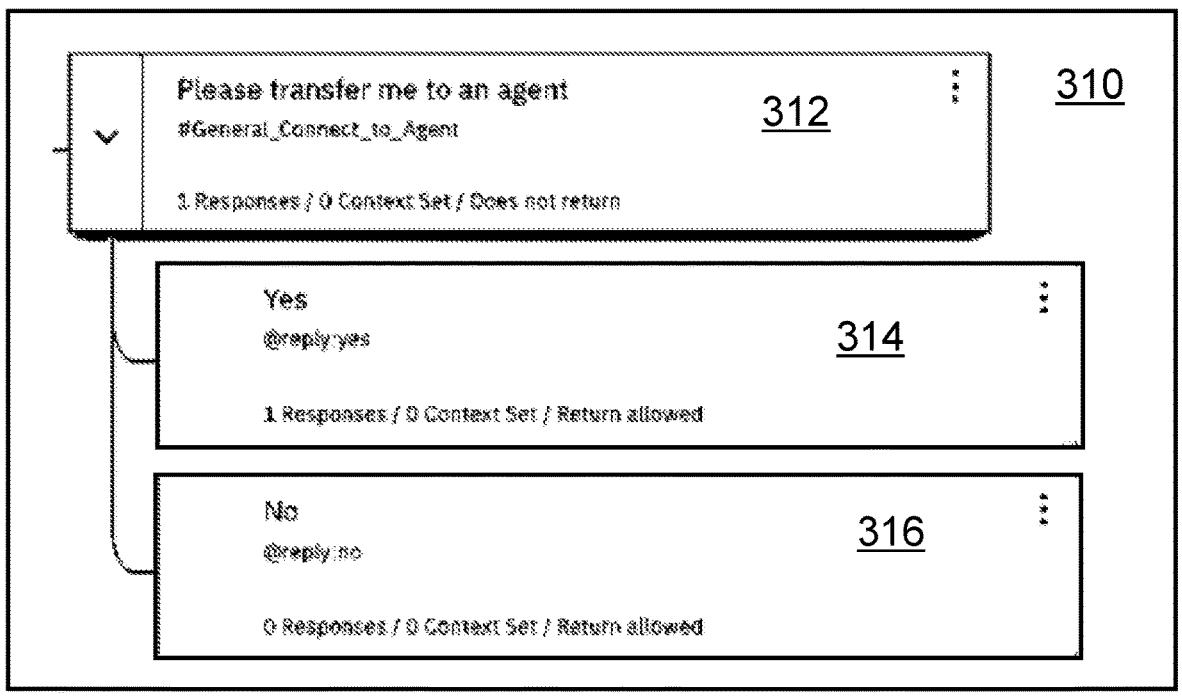
FIG. 3 depicts user interface displays, associated with an embodiment of the invention.
Figure 3:
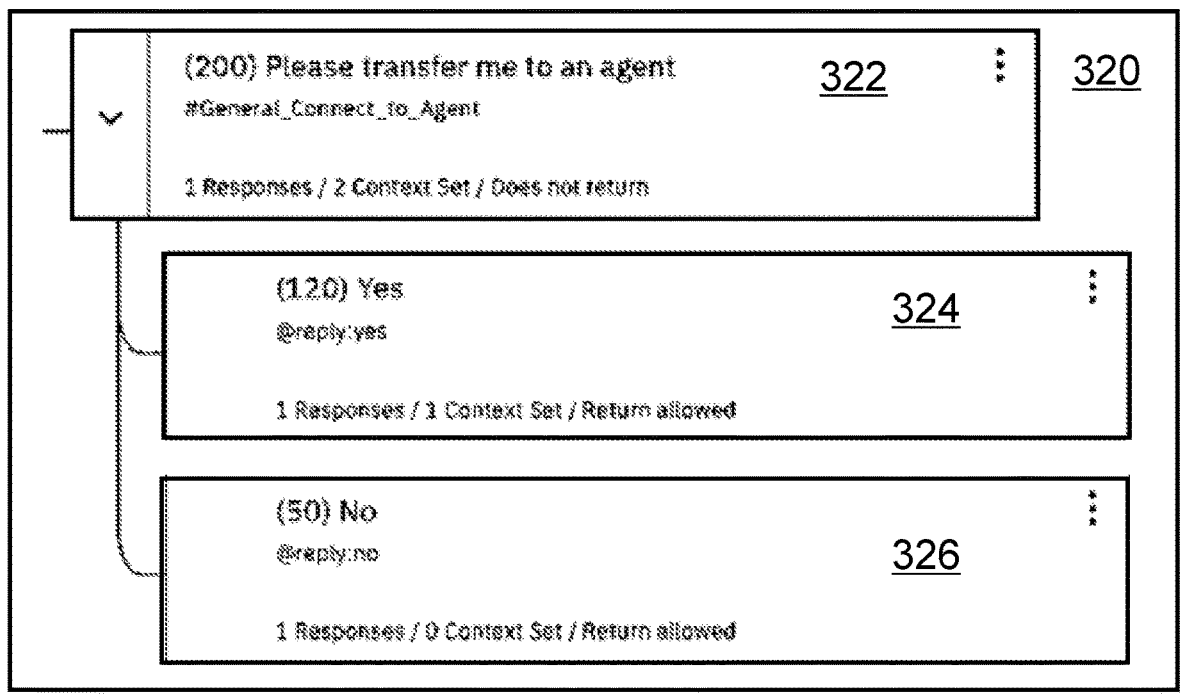

FIG. 3 provides user interface elements illustrating node data before and after implementation of embodiments of the invention. As shown in the Figure, dialog flow 310 includes a parent node 312 and two child nodes 314, and 316. The depicted dialog flow does not provide details about the relative flows from the parent to the respective child nodes. Dialog flow 320, depicting effects of disclosed embodiments, includes parent node 322, and well as child nodes 324, and 326. As shown in the Figure, parent node 320 was visited two hundred times in the conversation log data. Of those two hundred visits, one hundred twenty resulted in a visit to the "Yes" child node, and fifty resulted in a visit to the "No" child node. In this embodiment, further analysis of the respective dialog flows leading to this node and the thirty responses other than yes or no, is needed to evaluate why only 60% of users presented with the opportunity to speak to an agent elected to do so.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Embodiments of the invention may execute using a local computing environment, or a networked environment. The networked environment may include edge cloud and/or cloud computing resources as necessary for efficient implementation of the steps of the methods.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
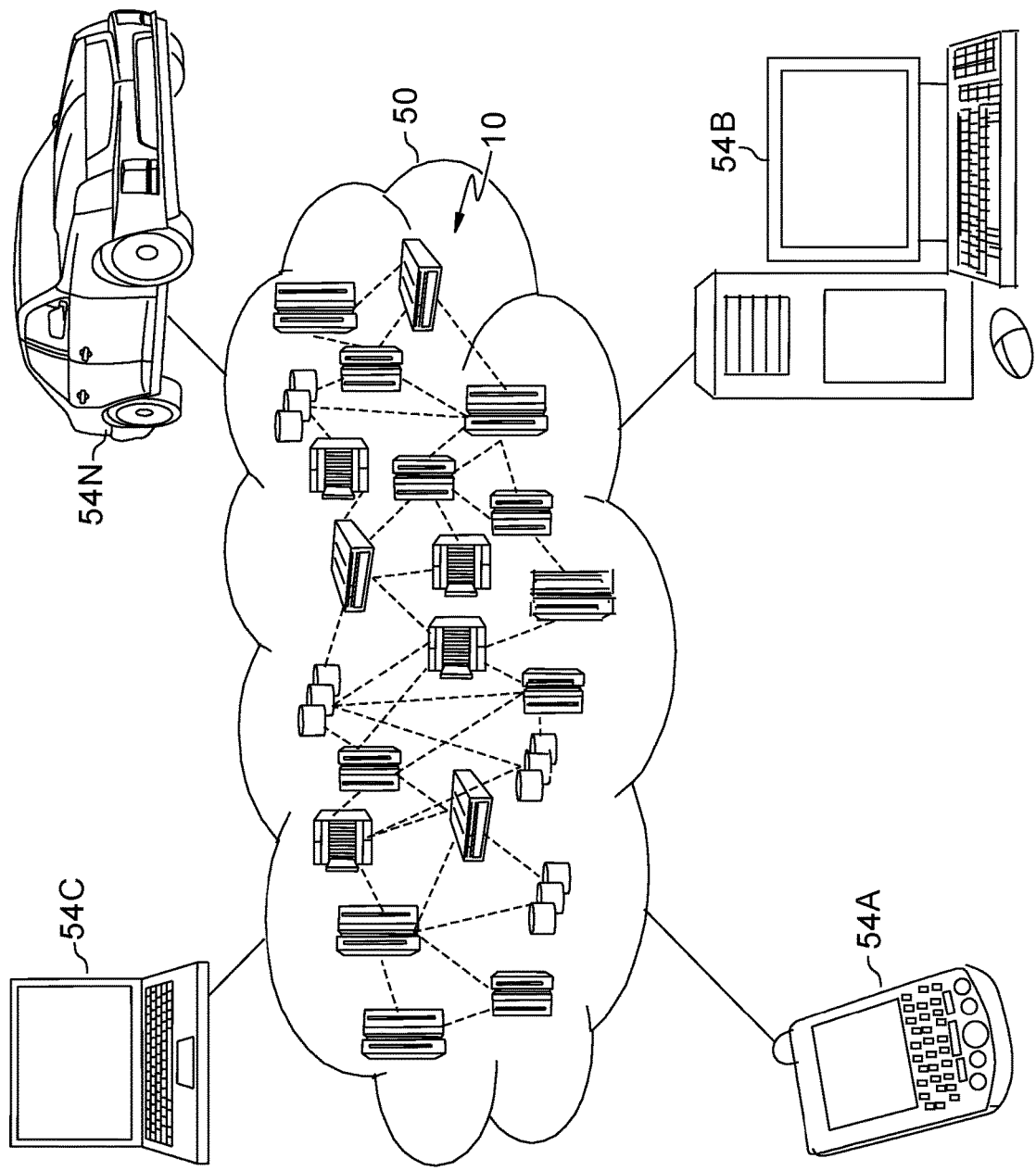
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
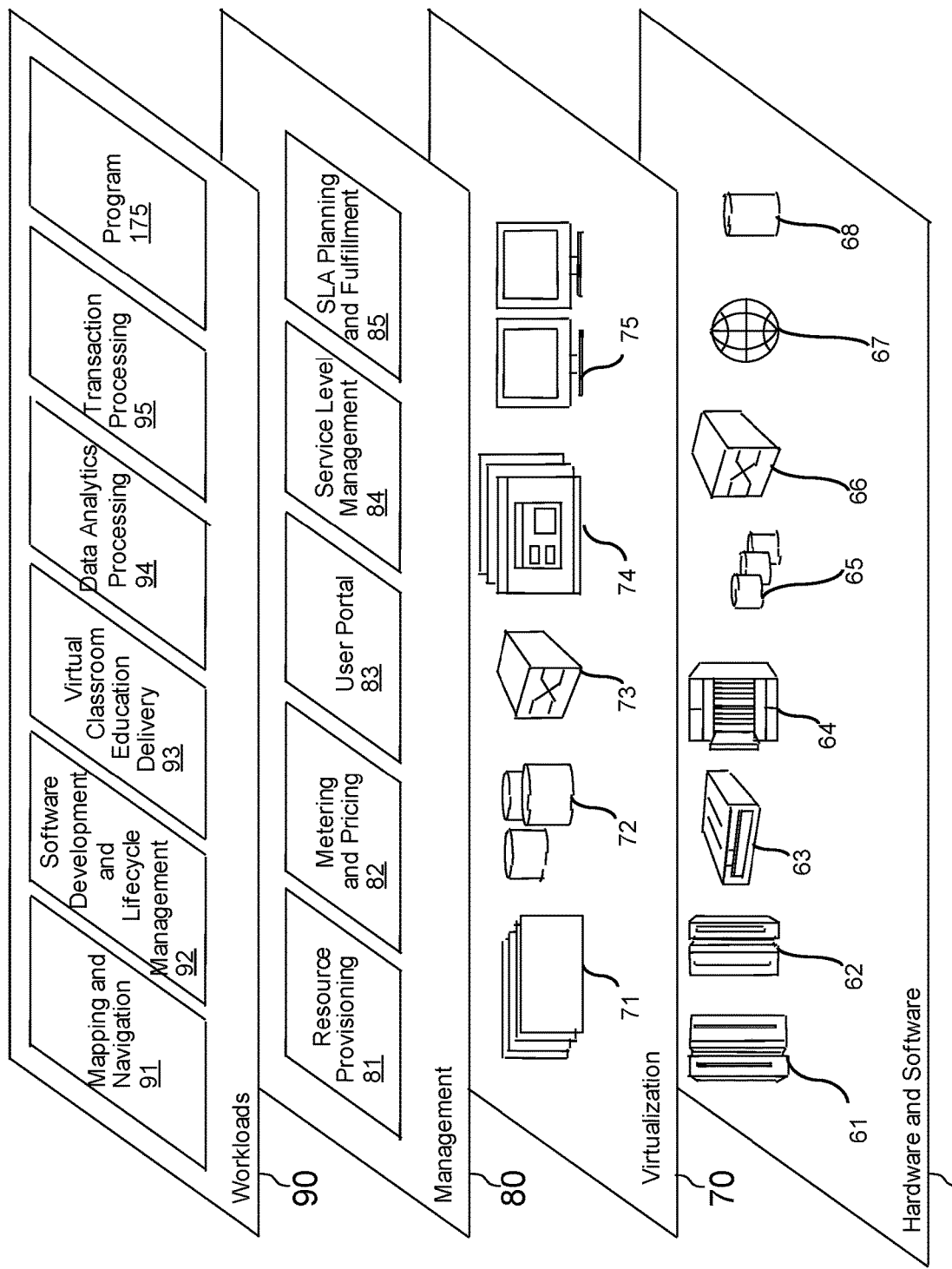
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic conversation modification program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for altering an automated conversation system, the method comprising:
    receiving, by one or more computer processors, automatic conversation log data;
    generating, by the one or more computer processors, a decision tree from the log data;
    summarizing, by the one or more computer processors, child node data for a node of the decision tree, wherein summarizing the child node data for the node comprises summarizing a distribution of parent node intents, entities, and context variable values, and child node response keywords; and
    generating, by the one or more computer processors, node response variations according to the child node data of the node by:
    generating alternative flows by changing an element selected from a group consisting of Boolean logic, operators, and combinations thereof, of conditional expressions of the node;
    determining changes associated with conditional results percentages for each generated alternative flow; and
    retaining only alternative flows having changes in conditional results percentages exceeding a defined threshold.

2. The method according to claim 1, wherein the log data comprises user conversation turns, user utterances, chatbot responses, and previous nodes visited.

3. The method according to claim 1, further comprising:
- annotating, by the one or more computer processors, conversation turns of the node; and
- generating, by the one or more computer processors, conversation turn variations according to the annotations of the conversation turns of the node.

4. The method according to claim 3, wherein annotating the conversation turns for the node comprises annotating a number of visits to the node, and the decision for each visit.

5. The method according to claim 3, wherein generating the conversation turn variations comprises generating variations according to node decision results.

6. The method according to claim 1, wherein generating node response variations comprises generating responses according to intents and/or entities.

7. A computer program product for altering an automated conversation system, the computer program product comprising one or more computer readable storage devices and collectively stored program instructions on the one or more computer readable storage devices, the stored program instructions comprising:
- program instructions to receive automatic conversation log data;
  - program instructions to generate a decision tree from the data;
  - program instructions to summarize child node data for a node of the decision tree, wherein summarizing the child node data for the node comprises summarizing a distribution of parent node intents, entities, and context variable values, and child node response keywords; and
  - program instructions to generate node response variations according to the child node data of the node by:
- generating alternative flows by changing an element selected from a group consisting of Boolean logic, operators, and combinations thereof, of conditional expressions of the node;
  - determining changes associated with conditional results percentages for each generated alternative flow; and
  - retaining only alternative flows having changes in conditional results percentages exceeding a defined threshold.

8. The computer program product according to claim 7, wherein the conversation log data comprises user conversation turns, user utterances, chatbot responses, and previous nodes visited.

9. The computer program product according to claim 7, the stored program instructions further comprising:
- program instructions to annotate conversation turns of the node; and
- program instructions to generate conversation turn variations according to the annotations of the conversation turns of the node.

10. The computer program product according to claim 9, wherein annotating the conversation turns for the node comprises annotating a number of visits to the node, and the decision for each visit.

11. The computer program product according to claim 9, wherein generating the conversation turn variations comprises generating variations according to node decision results.

12. The computer program product according to claim 7, wherein generating node response variations comprises generating responses according to intents and/or entities.

13. A computer system for altering an automated conversation system, the computer system comprising:
- one or more computer processors;
- one or more computer readable storage devices; and
- stored program instructions on the one or more computer readable storage devices for execution by the one or more computer processors, the stored program instructions comprising:
- program instructions to receive automatic conversation log data;
  - program instructions to generate a decision tree from the data;
  - program instructions to summarize child node data for a node of the decision tree, wherein summarizing the child node data for the node comprises summarizing a distribution of parent node intents, entities, and context variable values, and child node response keywords; and
- program instructions to generate node response variations according to the child node data of the node by:
- generating alternative flows by changing an element selected from a group consisting of Boolean logic, operators, and combinations thereof, of conditional expressions of the node;
  - determining changes associated with conditional results percentages for each generated alternative flow; and
  - retaining only alternative flows having changes in conditional results percentages exceeding a defined threshold.

14. The computer system according to claim 13, wherein the conversation log data comprises user conversation turns, user utterances, chatbot responses, and previous nodes visited.

15. The computer system according to claim 13, the stored program instructions further comprising:
- program instructions to annotate conversation turns of the node; and
- program instructions to generate conversation turn variations according to the annotations of the conversation turns of the node.

16. The computer system according to claim 15, wherein annotating the conversation turns for the node comprises annotating a number of visits to the node, and the decision for each visit.

17. The computer system according to claim 15, wherein generating the conversation turn variations comprises generating variations according to node decision results.

* * * * *